W. PRELLWITZ.
UNLOADER FOR COMPOUND FLUID COMPRESSORS.
APPLICATION FILED NOV. 20, 1908.
1,027,758.
Patented May 28, 1912.
6 SHEETS—SHEET 1.
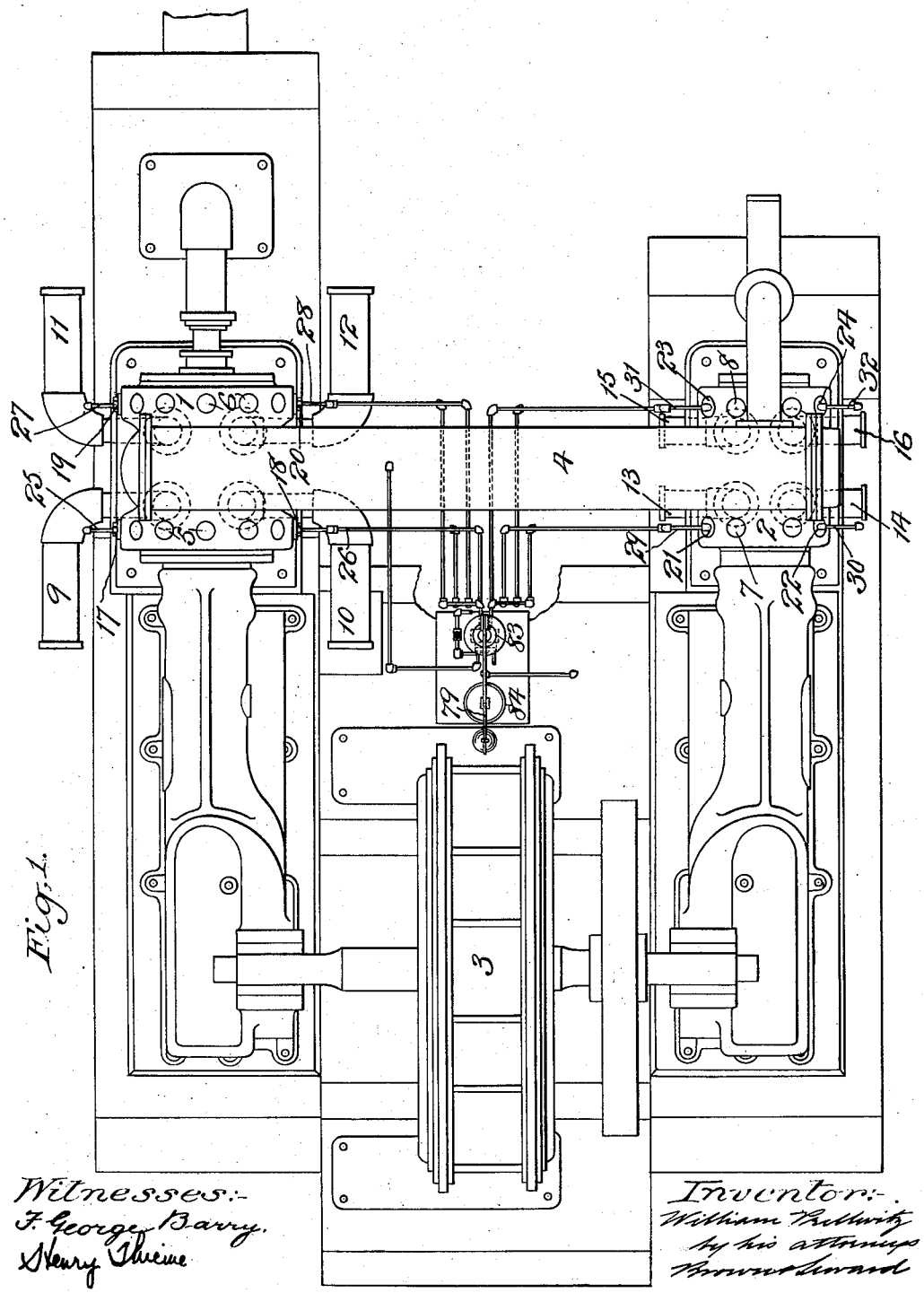

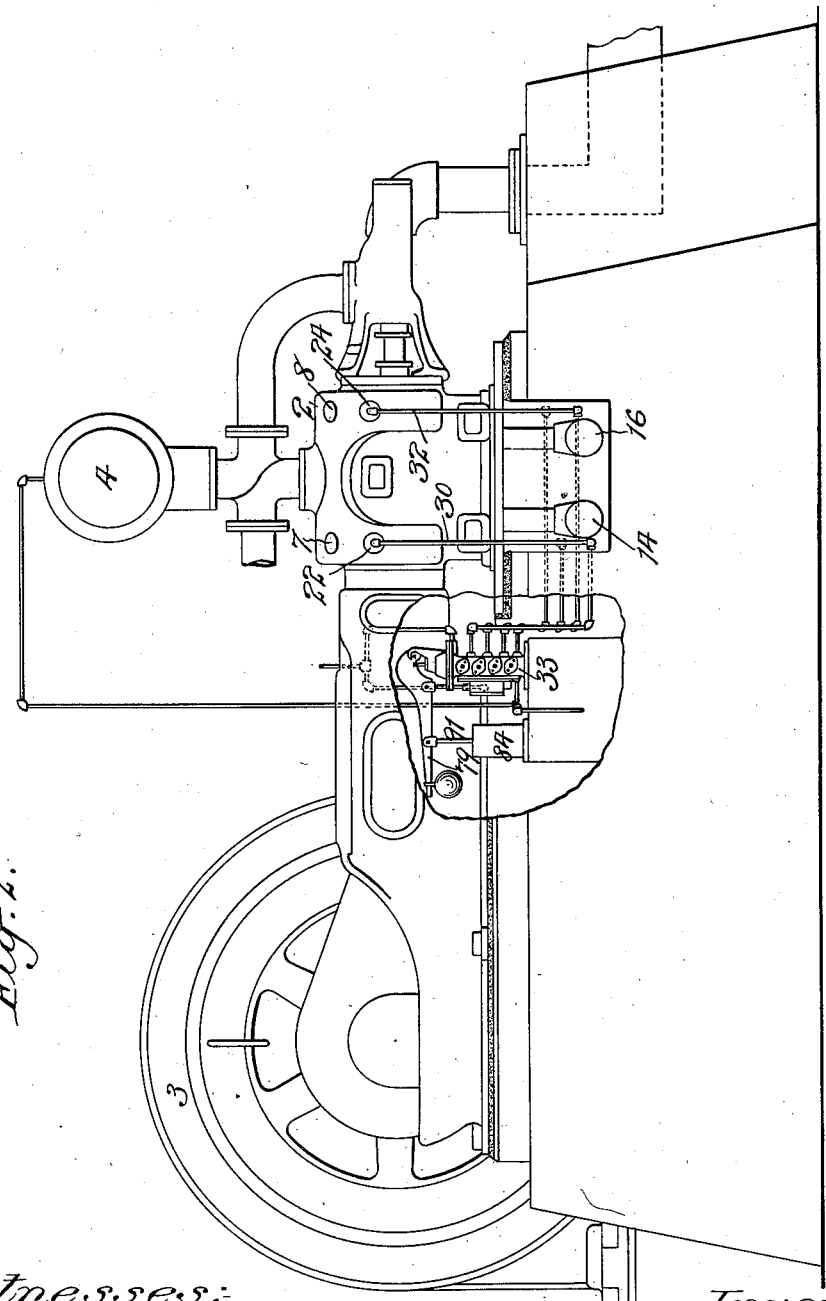

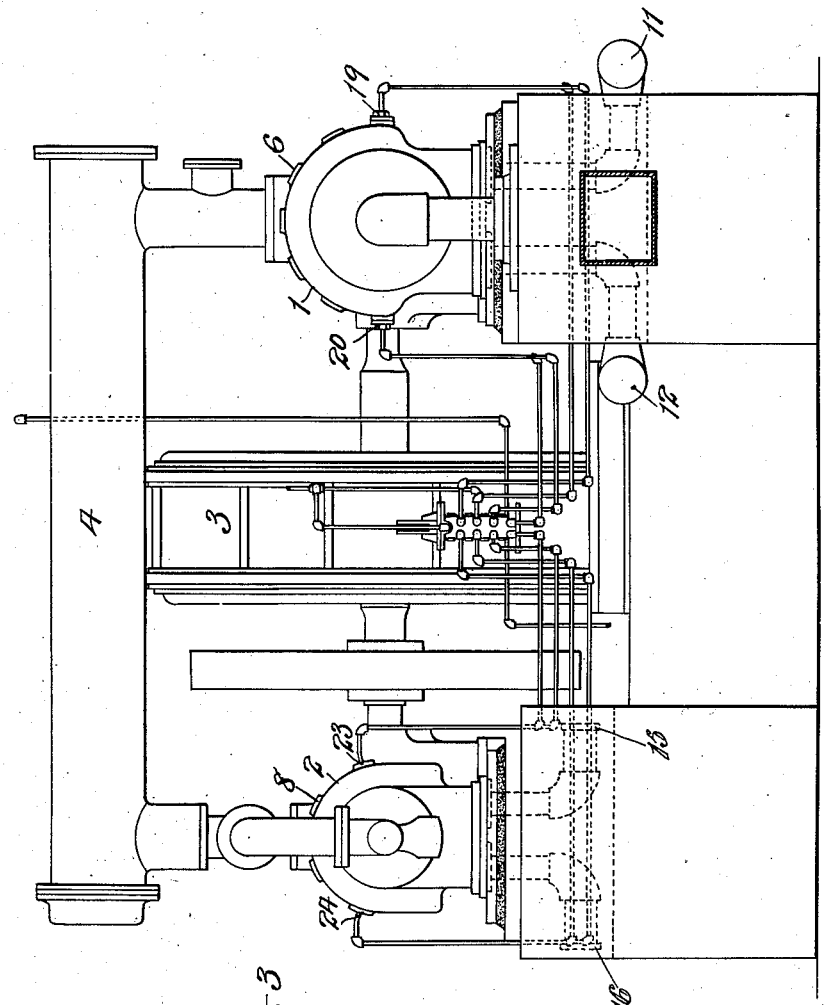

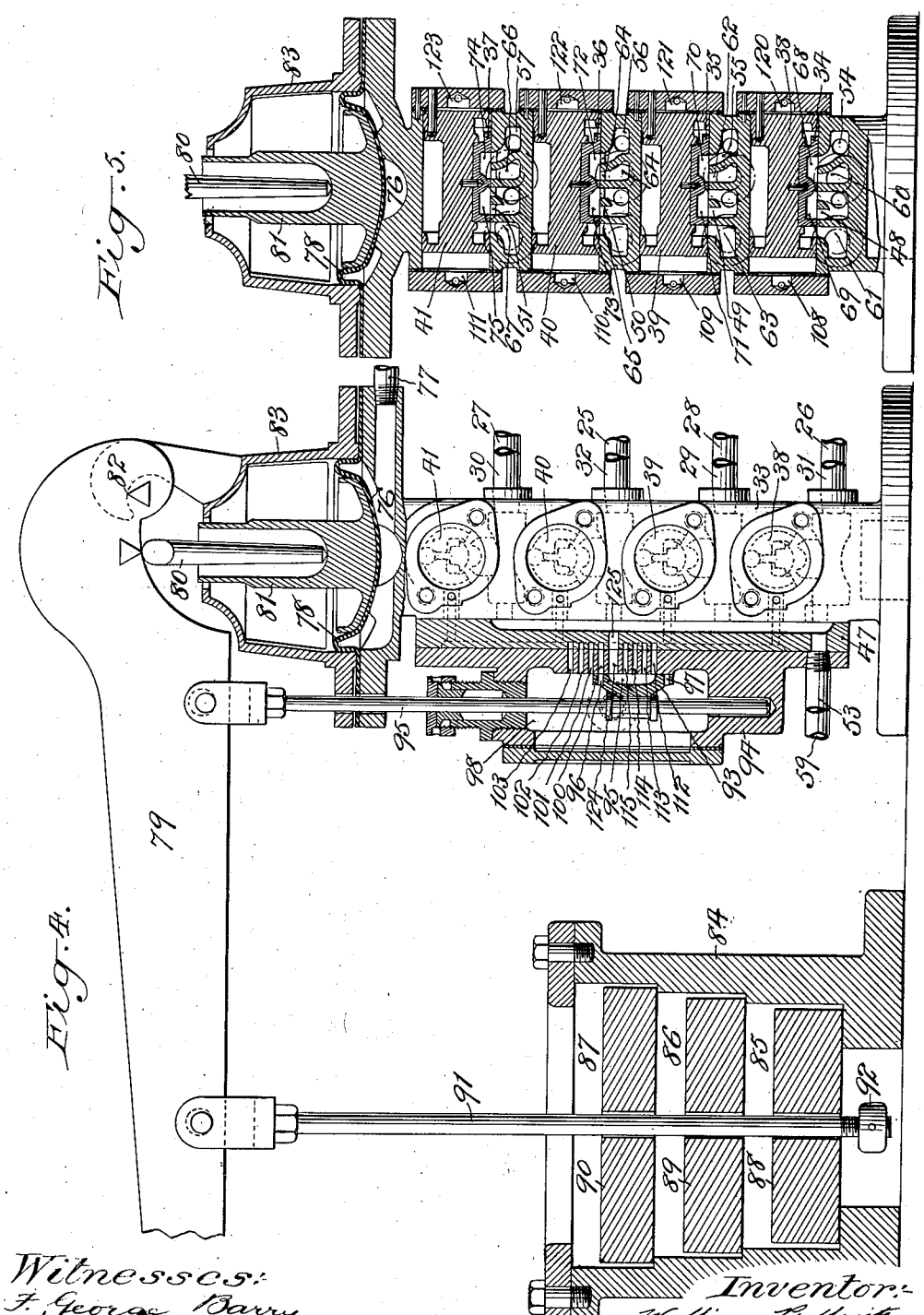

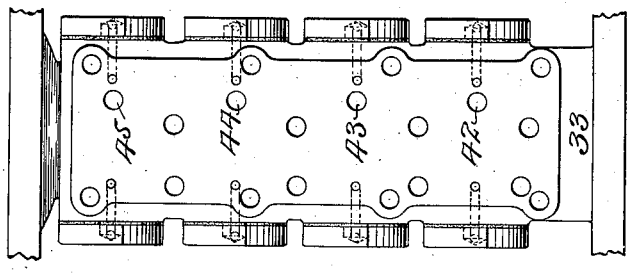
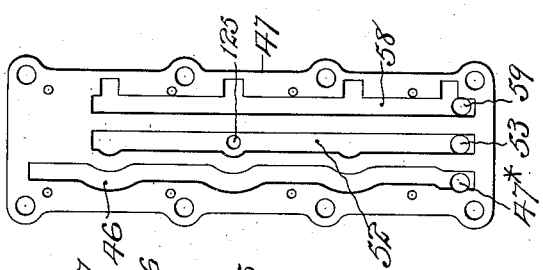
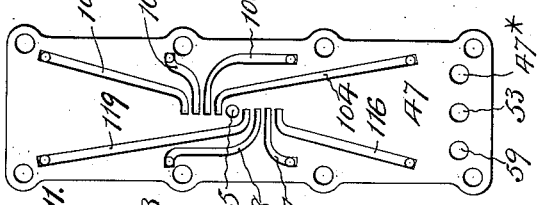
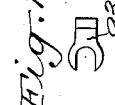
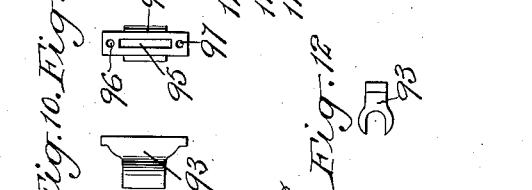
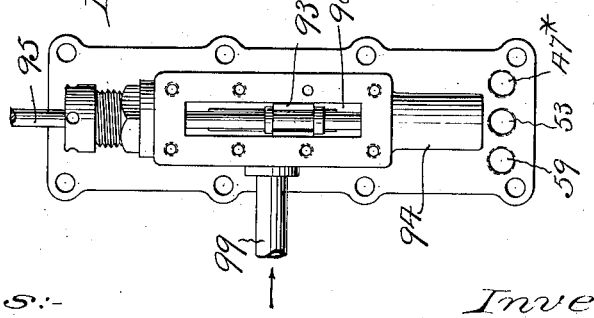

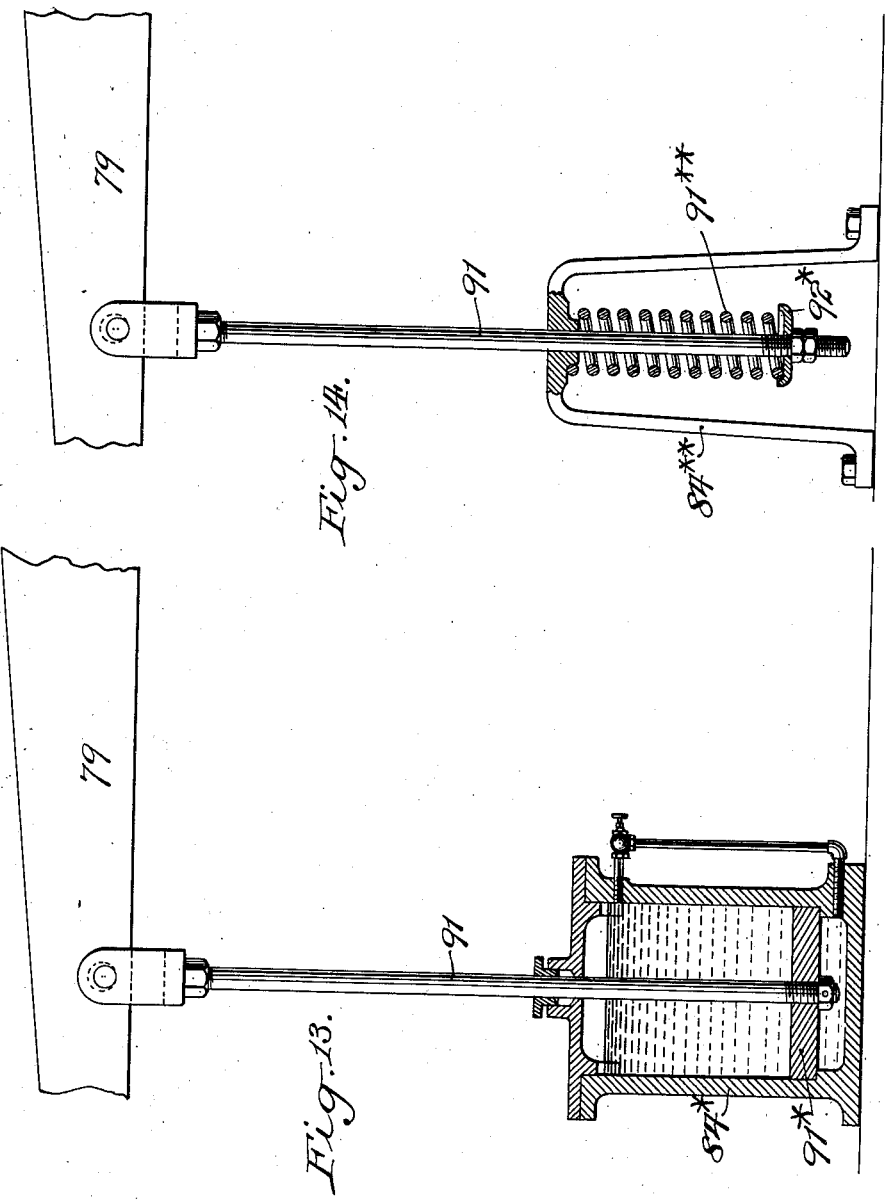

UNITED STATES PATENT OFFICE.

WILLIAM PRELLWITZ, OF EASTON, PENNSYLVANIA, ASSIGNOR TO INGERSOLL-RAND COMPANY, OF NEW YORK, N. Y., A CORPORATION OF NEW JERSEY.

UNLOADER FOR COMPOUND FLUID-COMPRESSORS.

1,027,758.  Specification of Letters Patent.  Patented May 28, 1912.

Application filed November 20, 1908. Serial No. 463,604.

*To all whom it may concern:*

Be it known that I, WILLIAM PRELLWITZ, a citizen of the United States, and resident of Easton, in the county of Northampton and State of Pennsylvania, have invented a new and useful Improvement in Unloaders for Compound Fluid-Compressors, of which the following is a specification.

This invention relates to improvements in fluid compressors and has for its principal object to provide a single device for controlling the loading and unloading of the pumping mechanism of a compound fluid compressor at successively attained pressures.

A further object is to provide a fluid pressure governed regulator having means, such as an auxiliary valve, arranged to successively operate a plurality of main regulator valves which control the loading and unloading of the compressor pumping mechanism.

A practical embodiment of my invention is represented in the accompanying drawings in which, Figure 1 is a top plan view of a duplex compound fluid compressor of the two stage type, with my improved invention applied thereto; Fig. 2 is a side view of the compressor with a portion of the same broken away; Fig. 3 is an end view of the compressor; Fig. 4 is an enlarged detail view, partially in section, of my improved regulator; Fig. 5 is a view taken at right angles to Fig. 4, partially in elevation and partially in section; Fig. 6 is an outer face view of the auxiliary valve chest with the cover plate removed; Fig. 7 is an outer face view of the port plate which is interposed between the auxiliary valve chest and the main valve chest; Fig. 8 is an inner face view of the port plate; Fig. 9 is a face view of the main valve chest, Figs. 10, 11 and 12 are detail side, face and end views of the auxiliary valve, Fig. 13 is a detail sectional view showing a dash pot resistance for the regulator lever, and Fig. 14 is a detail sectional view showing a spring resistance for the regulator lever.

I have chosen to illustrate my improved regulator in connection with a duplex compound fluid compressor of the two stage type, the cylinders of which are provided with auxiliary receivers arranged to be brought into and out of communication with the interiors of the compressor cylinders for securing a step by step unloading or loading of the same as the fluid in the final receiver reaches successively attained pressures.

The low pressure cylinder is denoted by 1 and the high pressure cylinder by 2. The motor for driving the fluid compressor is denoted by 3 and the intercooler is denoted by 4. The low pressure cylinder 1 may be provided with the usual discharge valves 5 and 6 at its opposite ends and the high pressure cylinder 2 may be provided with the usual discharge valves 7 and 8 at its opposite ends. The low pressure cylinder 1 is provided with four auxiliary receivers, the auxiliary receivers 9 and 10 communicating with the inner end of the cylinder and the auxiliary receivers 11 and 12 communicating with the outer end of the said cylinder. The high pressure cylinder 2 is similarly provided with four auxiliary receivers, the auxiliary receivers 13 and 14 communicating with the inner end of the cylinder and the receivers 15 and 16 communicating with the outer end of the said cylinder. Communication between these several auxiliary receivers and the interiors of the cylinders 1 and 2, is opened and closed by auxiliary receiver valves 17, 18, 19, 20, 21, 22, 23, 24. The backs of these auxiliary receiver valves are brought into communication with a single fluid pressure governed regulator, through pipes 25, 26, 27, 28, 29, 30, 31, 32, respectively.

The fluid pressure governed regulator herein shown is one which is adapted to load or unload the pumping mechanism of the compressor in four steps at successively attained pressures. The main valve chest 33 of the regulator is provided with four main regulator valves 34, 35, 36, 37, having double headed pistons 38, 39, 40, 41, respectively. The spaces between the heads of the several pistons are at all times open to receive pressure through ports 42, 43, 44, 45, opening into a common port 46 in the port plate 47, which port 46 is connected to a pipe 47* leading to the final receiver. The main regulator valve ports 48, 49, 50, 51, are at all times in open communication with external atmosphere, through a common port 52 in the port plate 47, which port 52 is in open communication with a pipe 53 leading to any suitable point. The main regulator valve ports 54, 55, 56, 57, are in open communication with the intercooler 4, through a common port 58 in the port plate 47, and a pipe 59 leading to said port 58 from the intercooler. The pipes 26, 31 leading from the backs of the auxiliary receiver valves 18, 23, have main regulator valve ports 60, 61. The pipes 28, 29 leading from the backs of the auxiliary receiver valves 20, 21, have main regulator valve ports 62, 63. The pipes 25, 32, leading from the backs of the auxiliary receiver valves 17, 24, have main regulator valve ports 64, 65. The pipes 27, 30 leading from the backs of the auxiliary receiver valves 19, 22, have main regulator valve ports 66, 67.

The main regulator valve 34 is provided with a bridge port 68 arranged to bring the port 60 into communication either with the port 54 or the port 48, and with a bridge port 69 arranged to open and close communication between the port 61 and the port 48. The main regulator valve 35 is provided with a bridge port 70 arranged to bring the port 62 either into communication with the port 55 or with the port 49, and with a bridge port 71 arranged to open and close communication between the port 63 and port 49. The main regulator valve 36 is provided with a bridge port 72 arranged to bring the port 64 either into communication with the port 56 or the port 50, and with a bridge port 73 arranged to open and close communication between the port 65 and the port 50. The main regulator valve 37 is provided with a bridge port 74 arranged to bring the port 66 either into communication with the port 57 or the port 51 and with a bridge port 75 arranged to open and close communication between the port 67 and the port 51. When these valves 34, 35, 36, 37 are at the limits of their movements in a direction to cut off communication between the ports 61, 63, 65, 67 and the ports 48, 49, 50, 51, respectively, the said ports 61, 63, 65, 66, are brought into open communication with the receiver pressure ports 42, 43, 44, 45, respectively.

Any suitable means may be employed for operating the several main regulator valves at successively attained pressures so as to unload or load the pumping mechanism step by step, which means is shown in the present instance as constructed, arranged and operated as follows. A chamber 76 is provided in the top of the main valve chest 33, which chamber is at all times opened to receiver pressure, through a pipe 77. This chamber is provided with a flexible diaphragm 78, which diaphragm receives the weight of a lever 79 through connecting pieces 80, 81. This lever 79 is pivoted at 82 on the top 83 of the main valve chest 33.

A graduated resistance is provided for the lever 79, which resistance is shown in Fig. 4 as a device arranged to successively add additional weights to the lever 79 as the receiver pressure rises and for successively removing the weights therefrom as the receiver pressure falls, as follows. A suitable casing 84 is provided with a stepped bore, the smallest bore being denoted by 85, the next larger by 86 and the largest by 87. Three disks 88, 89, 90 rest normally on the shoulders at the bottoms of their respective bores and are arranged to be successively picked up and deposited by providing a rod 91, which rod passes downwardly through the said weights and is pivoted at its upper end to the lever 79 and is provided at its lower end with a collar 92 below the weights 88. In Fig. 13 this resistance for the lever 79 is shown as a dash pot 84*, the piston 91* being carried by the rod 91. In Fig. 14 this resistance is shown as a spring 91** surrounding the rod 91 and interposed between a collar 92* on the rod and a support 84**. This weighted lever 79 operates the means which controls the movements of the main valves, which means in the present instance is shown as an auxiliary valve 93 fitted to slide within the auxiliary valve chest 94. A rod 95 is connected at its upper end to the lever 79 and is also connected to the auxiliary valve 93. This auxiliary valve 93 is provided with a bridge port 95 and through ports 96, 97. The chamber 98 within which the auxiliary valve 93 slides, is at all times open to receiver pressure, through a pipe 99. The inner wall of the auxiliary valve chest 94 is provided with ports 100, 101, 102, 103 which are in open communication through passages 104, 105, 106, 107, in the port plate 47, with ports 108, 109, 110, 111, at the corresponding ends of the main regulator valve pistons 38, 39, 40, 41. The inner wall of the auxiliary valve chest 94 is also provided with ports 112, 113, 114, 115, which are in open communication through passages 116, 117, 118, 119, in the port plate 47, with ports 120, 121, 122, 123, on the opposite sides of the main regulator valve pistons 38, 39, 40, 41. The inner wall of the auxiliary valve chest 94 is also provided with a port 124 which is at all times in open communication with external atmosphere, through a port 125 in the port plate 47. The ports 100, 101, 102, 103, 112, 113, 114, 115, and 124 are arranged in alinement in the path of the auxiliary valve 93.

The operation of the fluid pressure governed regulator as illustrated in Figs. 1–12 inclusive, is as follows. When the parts are in their normal positions shown in the accompanying drawings, the auxiliary valve will be at the limit of its downward movement. This position of the valve will leave the ports 100, 101, 102, 103 and thereby the ports 108, 109, 110, 111 open to receive pressure; and the ports 112, 113, 114, 115 and thereby the ports 120, 121, 122, 123 open to external atmosphere. This will cause all of the main regulator valves to be forced to the limits of their movements in a direction which will open the backs of the several auxiliary receiver valves to receiver pressure and thus hold the said valves closed. As the receiver pressure begins to rise, it will act upon the diaphragm 78, thus raising the lever 79. When the lever 79 has been raised a predetermined distance, the auxiliary valve 93 will be moved into a position to open the port 100 and thereby the port 108 to external atmosphere, and at the same time open the port 112 and thereby the port 120 to receiver pressure within the auxiliary valve chamber 98, through the port 97 in the auxiliary valve. This condition will force the main regulator valve 34 to the limit of its movement in the opposite direction, thereby unloading the back of the auxiliary receiver valve 18 at the inner end of the low pressure cylinder 1 and the auxiliary receiver valve 23 at the outer end of the high pressure cylinder 2. If the receiver pressure still continues to rise after this partial unloading of the pumping mechanism, the further upward movement of the lever 79 will cause the collar 92 to lift the weight 88. The auxiliary valve 83 is so constructed that this additional upward movement of the lever 79 will cause the shifting of the next succeeding main regulator valve 35 to cause it to unload the auxiliary receiver valve 20 at the outer end of the low pressure cylinder and the auxiliary receiver valve 21 at the inner end of the high pressure cylinder. A still further rise in the receiver pressure will cause the weight 89 to be picked up and will cause the auxiliary valve 93 to unload the auxiliary receiver valve 17 at the inner end of the low pressure cylinder and the auxiliary receiver valve 24 at the outer end of the high pressure cylinder. A still further rise in the receiver pressure will cause the weight 90 to be pciked up and will cause the auxiliary valve 93 to unload the auxiliary receiver valve 19 at the outer end of the low pressure cylinder and the auxiliary receiver valve 22 at the inner end of the high pressure cylinder. It will be seen that as the receiver pressure falls, the influence of the several weights will be removed from the lever 79 and also that the load will be thrown on to the pumping mechanism step by step. It will also be seen that in the structure herein set forth, the auxiliary receiver valves of the low pressure cylinder are loaded from the intercooler, while the auxiliary receiver valves of the high pressure cylinder are loaded from the receiver.

While I have shown and described this fluid pressure governed regulator as applied to a compound fluid compressor, having auxiliary receivers for returning the pressure fluid back to the pumping mechanism, it is to be understood that the regulator may be used for unloading and loading any compound fluid compressor at predetermined points. Furthermore, it is to be understood that while this fluid pressure governed regulator is shown in connection with a duplex compound fluid compressor, it may be used in connection with any other type of compound fluid compressor as may be desired. It is also to be understood that I do not wish to limit myself to a four step loading and unloading of a compound fluid compressor by a single regulator, but it is intended that this regulator should cover the loading and unloading of a compound fluid compressor in any number of steps desired.

Attention is called to my co-pending application filed of even date herewith Serial No. 463603, in which application claims are pending directed to the loading and unloading by novel means of a fluid compressor of any type as distinguished from this present application which is directed to the loading and unloading of a compound fluid compressor of any type by similar means.

What I claim is:

1. The combination with the high and low pressure cylinders of a compound fluid compressor, of auxiliary receivers for the low pressure cylinder, valves for opening and closing communication between the low pressure cylinder and the auxiliary receivers and a regulator connected to the backs of the valves for successively unloading them as different predetermined high pressures are reached.

2. The combination with the high and low pressure cylinders of a compound fluid compressor, of auxiliary receivers for the low pressure cylinder, valves for opening and closing communication between the low pressure cylinder and the auxiliary receivers and a fluid pressure governed regulator connected to the backs of the valves for successively unloading them as different predetermined high pressures are reached.

3. The combination with the high and low pressure cylinders of a compound fluid compressor, of auxiliary receivers for the low pressure cylinder, valves for opening and closing communication between the low pressure cylinder and the auxiliary receivers and a regulator for successively unloading the valves as the pressure rises to predetermined points and for successively loading the valves as the pressure falls to predetermined points, for automatically unloading and loading the compressor step by step.

4. The combination with the cylinders of a compound fluid compressor, of auxiliary receivers therefor, valves for opening and closing communication between the cylinders and their auxiliary receivers and a regulator connected to the backs of the valves for successively unloading them as different predetermined high pressures are reached, for unloading the compressor step by step.

5. The combination with the cylinders of a compound fluid compressor, of auxiliary receivers therefor, valves for opening and closing communication between the cylinders and their auxiliary receivers and a fluid pressure governed regulator connected to the backs of the valves for successively unloading them as different predetermined high pressures are reached for unloading the compressor step by step.

6. The combination with the cylinders of a compound fluid compressor, of auxiliary receivers therefor, valves for opening and closing communication between the cylinders and their auxiliary receivers and a regulator for successively unloading the valves as the pressure rises to predetermined points and for successively loading the valves as the pressure falls to predetermined points, for automatically unloading and loading the compressor step by step.

7. The combination with the cylinders of a compound fluid compressor, of auxiliary receivers therefor, valves for opening and closing communication between the cylinders and their auxiliary receivers and a fluid pressure governed regulator for successively unloading the valves as the pressure rises to predetermined points and for successively loading the valves as the pressure falls to predetermined points, for automatically unloading and loading the compressor step by step.

8. The combination with the cylinders of a compound fluid compressor, of a plurality of auxiliary receivers for each cylinder, valves for opening and closing communication between the cylinders and their auxiliary receivers and a regulator connected to the backs of the valves for successively unloading them as different predetermined high pressures are reached for unloading the compressor step by step.

9. The combination with the cylinders of a compound fluid compressor, of a plurality of auxiliary receivers for each cylinder, valves for opening and closing communication between the cylinders and their auxiliary receivers and a fluid pressure governed regulator connected to the backs of the valves for successively unloading them as different high pressures are reached for unloading the compressor step by step.

10. The combination with the cylinders of a compound fluid compressor, of a plurality of auxiliary receivers for each cylinder, valves for opening and closing communication between the cylinders and their auxiliary receivers and a regulator for successively unloading the valves as the pressure rises to predetermined points and for successively loading the valves as the pressure falls to predetermined points, for automatically unloading and loading the compressor step by step.

11. The combination with the cylinders of a compound fluid compressor, of a plurality of auxiliary receivers for each cylinder, valves for opening and closing communication between the cylinders and their auxiliary receivers and a fluid pressure governed regulator for successively unloading the auxiliary receiver valves as the pressure rises to predetermined points and for successively loading the valves as the pressure falls to predetermined points, for automatically unloading and loading the compressor step by step.

12. The combination with the cylinders of a compound fluid compressor, of a regulator therefor comprising a plurality of main valves independent of the compressor valves arranged to control the loading and unloading of the compressor cylinders and fluid pressure operated means for controlling the movements of the said main valves.

13. The combination with the high and low pressure cylinders of a compound fluid compressor, of auxiliary receivers, valves for opening and closing communication between the cylinders and the auxiliary receivers and a regulator comprising a plurality of main valves arranged to open the backs of the auxiliary receiver valves for the high pressure cylinder either to receiver pressure or to atmosphere and means for controlling the movements of the said main valves.

14. The combination with the high and low pressure cylinders of a compound fluid compressor, of auxiliary receivers, valves for opening and closing communication between the cylinders and the auxiliary receivers and a regulator comprising a plurality of main valves arranged to open the backs of the auxiliary receiver valves for the high pressure cylinder either to receiver pressure or to atmosphere, and fluid pressure operated means for controlling the movements of the said main valves.

15. The combination with the high and low pressure cylinders of a compound fluid compressor, of auxiliary receivers, valves for opening and closing communication between the cylinders and auxiliary receivers and a regulator comprising a plurality of main valves arranged to open the backs of the auxiliary receiver valves for the high pressure cylinder either to receiver pressure or to atmosphere and a single auxiliary valve for controlling the movements of the said main valves.

16. The combination with the high and low pressure cylinders of a compound fluid compressor, of auxiliary receivers, valves for opening and closing communication between the cylinders and auxiliary receivers and a regulator comprising a plurality of main valves arranged to open the backs of the auxiliary receiver valves for the high pressure cylinder either to receiver pressure or to atmosphere, a single auxiliary valve for controlling the movements of the said main valves and a fluid pressure operated lever for moving the auxiliary valve.

17. The combination with the cylinders of a compound fluid compressor, of a regulator therefor comprising a plurality of main valves independent of the compressor valves, arranged to control the loading and unloading of the compressor cylinders and a single auxiliary valve for controlling the movements of the main valves.

18. The combination with the cylinders of a compound fluid compressor, of a regulator therefor comprising a plurality of main valves independent of the compressor valves, arranged to control the loading and unloading of the compressor cylinders, a single auxiliary valve for controlling the movements of the main valves, and a fluid pressure controlled lever for moving the auxiliary valve.

19. The combination with the cylinders of a compound fluid compressor, of a regulator therefor comprising a plurality of main valves independent of the compressor valves, arranged to control the loading and unloading of the compressor cylinders, a single auxiliary valve for controlling the movements of the main valves, a fluid pressure controlled lever for moving the auxiliary valve and means for successively applying weights to and removing them from said lever as the lever reaches different predetermined points.

20. The combination with the cylinders of a compound fluid compressor, of a regulator therefor comprising a plurality of main valves independent of the compressor valves, arranged to control the loading and unloading of the low pressure cylinder, and a single auxiliary valve for controlling the movements of the main valves.

21. The combination with the cylinders of a compound fluid compressor, of a regulator therefor comprising a plurality of main valves independent of the compressor valves, arranged to control the loading and unloading of the low pressure cylinder, a single auxiliary valve for controlling the movements of the main valves, and a fluid pressure controlled lever for moving the auxiliary valve.

22. The combination with the cylinders of a compound fluid compressor, of a regulator therefor comprising a plurality of main valves independent of the compressor valves, arranged to control the loading and unloading of the low pressure cylinder, a single auxiliary valve for controlling the movements of the main valves, a fluid pressure controlled lever for moving the auxiliary valve, and means for successively applying weights to and removing them from said lever as the lever reaches different predetermined points.

23. The combination with the cylinders of a compound fluid compressor, of a regulator therefor comprising a plurality of main valves independent of the compressor valves, arranged to control the loading and unloading of the high pressure cylinder, and a single auxiliary valve for controlling the movements of the main valves.

24. The combination with the cylinders of a compound fluid compressor, of a regulator therefor comprising a plurality of main valves independent of the compressor valves arranged to control the loading and unloading of the high pressure cylinder, a single auxiliary valve for controlling the movements of the main valves, and a fluid pressure controlled lever for moving the auxiliary valve.

25. The combination with the cylinders of a compound fluid compressor, of a regulator therefor comprising a plurality of main valves arranged to control the loading and unloading of the high pressure cylinder, a single auxiliary valve for controlling the movements of the main valves, a fluid pressure controlled lever for moving the auxiliary valve, and means for successively applying weights to and removing them from said lever as the lever reaches different predetermined points.

26. The combination with the cylinders of a compound fluid compressor, of a regulator therefor comprising a plurality of main valves arranged to open the backs of certain of the low pressure cylinder valves either to intercooler pressure or to atmosphere for loading or unloading the low pressure cylinder valves, a single auxiliary valve for controlling the movements of the main valves, a fluid pressure controlled lever for moving the auxiliary valve, and means for successively applying weights to and removing them from said lever as the lever reaches different predetermined points.

27. The combination with the cylinders of a compound fluid compressor, of a regulator therefor comprising a plurality of main valves arranged to open the backs of certain of the high pressure cylinder valves either to receiver pressure or to atmosphere for loading or unloading the high pressure cylinder valves, a single auxiliary valve for controlling the movements of the main valves, a fluid pressure controlled lever for moving the auxiliary valve, and means for successively applying weights to and removing them from said lever as the lever reaches different predetermined points.

28. The combination with the cylinders of a compound fluid compressor, of a regulator therefor comprising a plurality of main valves arranged to open the backs of certain of the low pressure cylinder valves either to intercooler pressure or to atmosphere and certain of the high pressure cylinder valves either to receiver pressure or to atmosphere for loading and unloading the said low and high pressure cylinder valves, a single auxiliary valve for controlling the movements of said main valves, a fluid pressure controlled lever for moving the auxiliary valve, and means for successively applying weights to and removing them from said lever as the lever reaches different predetermined points.

In testimony, that I claim the foregoing as my invention, I have signed my name in presence of two witnesses, this ninth day of November, 1908.

WILLIAM PRELLWITZ.

Witnesses:
F. GEORGE BARRY,
HENRY THIEME.